United States Patent [19]

Vautier

[11] Patent Number: 4,675,843
[45] Date of Patent: Jun. 23, 1987

[54] PROGRAMMABLE LOGIC CONTROLLER

[75] Inventor: Remi A. Vautier, Nice, France

[73] Assignee: International Business Machines Corporation, Armonk, N.Y.

[21] Appl. No.: 566,102

[22] Filed: Dec. 27, 1983

[30] Foreign Application Priority Data

Dec. 28, 1982 [EP] European Pat. Off. ........ 82430044.6

[51] Int. Cl.[4] ............................................. G06F 3/00
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,753,243 | 8/1973 | Ricketts, Jr. et al. | 340/172.5 |
| 3,849,765 | 11/1974 | Hamano | 340/172.5 |
| 3,944,987 | 3/1976 | Koyanagi et al. | 340/172.5 |
| 3,975,622 | 8/1976 | Horn et al. | 364/900 |
| 3,996,565 | 12/1976 | Nakao et al. | 364/900 |
| 4,048,622 | 9/1977 | Yomogida | 364/900 |
| 4,178,634 | 12/1979 | Bartlett | 364/900 |
| 4,270,184 | 5/1981 | Shimokawa | 364/900 |
| 4,316,260 | 2/1982 | Hideshima et al. | 364/900 |
| 4,326,207 | 4/1982 | Suda et al. | 364/900 |
| 4,339,794 | 7/1982 | Hideshima et al. | 364/200 |

Primary Examiner—Gareth D. Shaw
Assistant Examiner—Kevin A. Kriess
Attorney, Agent, or Firm—Roy R. Schlemmer

[57] ABSTRACT

The programmable logic controller uses a set of instructions which comprises only three instructions: a Read instruction and a Write instruction which includes an operation code, a condition bit, and an address, and a Jump instruction which includes an operation code and an address. When a Read instruction is read from control memory (10), a condition latch (35) is set to 1 or 0 depending on whether the level of the addressed input corresponds or not to the level of the condition bit. For a Write operation, the state of latch (35) or its inverse is provided at the addressed output in accordance with the value of the condition bit. A Jump instruction is executed only if the condition latch (35) is set to 1. A random access memory (50) may be utilized to function as one of the input multiplexers (RI0 to RI2) and one of the output demultiplexers (RO0 to RO2), which allows the controller to store events and to use said events later on.

4 Claims, 3 Drawing Figures

PROGRAMMABLE LOGIC CONTROLLER

DESCRIPTION

1. Technical Field

This invention relates to digitally programmed control systems, and more particularly to a programmable logic controller which analyzes the binary level of a plurality of input terminals and controls the binary level of a plurality of output terminals in accordance with the result of the analysis and a predetermined logic contained in a program.

2. Prior Art

The logic architecture of many data processing units is based on a main processor connected to a plurality of input/output devices such as detectors, relays . . . etc, through appropriate adapters. For most of the functions to be performed by the processing unit, it must be determined which portion of these functions is to be handled by the main processor and which portion is to be handled by the adapters. Up to now, such adapters have generally consisted of wired logic devices and the main portion of the functions is handled by the main processor.

Programmable logic controllers can advantageously be used as adapters while offering greater flexibility and having more logic signal processing capabilities. Further, while a wired adapter is only designed for a well determined application, a single programmable logic controller is to be adapted only at the program level and can be mass-produced, which makes it cheaper.

U.S. Pat. No. 3,753,243 describes a programmable logic controller which primarily comprises a program memory containing a sequence of instructions, an input selector, an output selector, and a condition latch. The controller uses a set of seven instructions, each including an operation code and an address field. The condition latch is controlled by two instructions which, respectively, set said latch to a binary "1" or to a binary "0" depending on whether the selected input is at a first or a second level. The instruction set further comprises two instructions for setting the selected output to one of two predetermined levels independently of the state of the condition latch, and three jump instructions.

A drawback of the logic controller described in the above indicated French patent, is that its instruction set comprises a relatively high number of instructions, which causes the writing of programs by non-programmer users to be difficult. In addition, this relatively high number of instructions causes the execution time of a function to be long. Some examples given at the end of the present patent (application), should permit this controller to be compared with the controller of the invention. Another drawback of the logic controller described in the above indicated French patent is that it does not allow events or data to be stored and used later on.

U.S. Pat. No. 3,849,765 describes a programmable logic controller using a set of instructions consisting of a single 32-bit instruction which comprises an output condition field, an output address bit, an input condition bit, an input address field, and two jump address fields. The drawback of the logic controller described in this French patent lies in the fact that the high number of bits per instruction increases the program complexity, and in the fact that its hardware portion as opposed to its program portion, is particularly well adapted to handling multiple tasks. This makes the execution of easy functions much more complicated. Further, this logic controller neither allows events or data to be stored and used later on.

SUMMARY OF THE INVENTION

It is a primary object of this invention to provide a simple programmable logic controller not having the above indicated drawbacks and susceptible to being easily programmed.

It is another object of this invention to provide a programmable logic controller with a working memory allowing said controller to process data.

The programmable logic controller of this invention generally includes:

a plurality of input terminals, a plurality of output terminals, a control memory which contains a sequence of instructions comprising instructions of a first type (READ) and instructions of a second type (WRITE), each of these two types of instruction comprising an operation code, a condition bit and an address field, addressing means for sequentially addressing said control memory, input selecting means for selectively connecting one of said input terminals to a first line in response to the contents of the address field of the instruction read from said control memory, output selecting means for selectively connecting a second line to one of said output terminals in response to the contents of the address fields of the instruction read from said control memory, a condition latch, comparing means for comparing the level of said first line with that of said condition bit, decoding means for decoding the operation code of the instruction read from said control memory, means operable, in response to the decoding of an instruction of the first type by said decoding means, for setting the condition latch to a first or a second state depending on whether the result of the comparison provided by the comparing means is positive or negative, and means operable, in response to the decoding of an instruction of the second type by said decoding means, for providing the state of the condition bit or its inverse at said second line depending on whether the condition latch is in its first or second state.

According to a further feature of the invention, the sequence of instructions contained in the control memory further comprises instructions of a third type (JUMP), each of them including an operation code and an address field, and means for applying the contents of the address field of a third type-instruction read from the control memory, to the addressing means if the condition latch is set to its first state.

According to another feature of the invention, the programmable logic controller comprises a random access memory which is addressed by the address field of the instruction read from the memory, the input of said random access memory being connected to said second line and its output being connected to said first line, and said random access memory operating in the read or write mode depending on whether the instruction read from the memory is of the first or second type.

Specific features of the invention, as well as specific objects and advantages thereof, will become readily apparent from the following detailed description, taken in conjunction with the accompanying drawings.

DETAILED DESCRIPTION OF THE INVENTION

Figure 1:
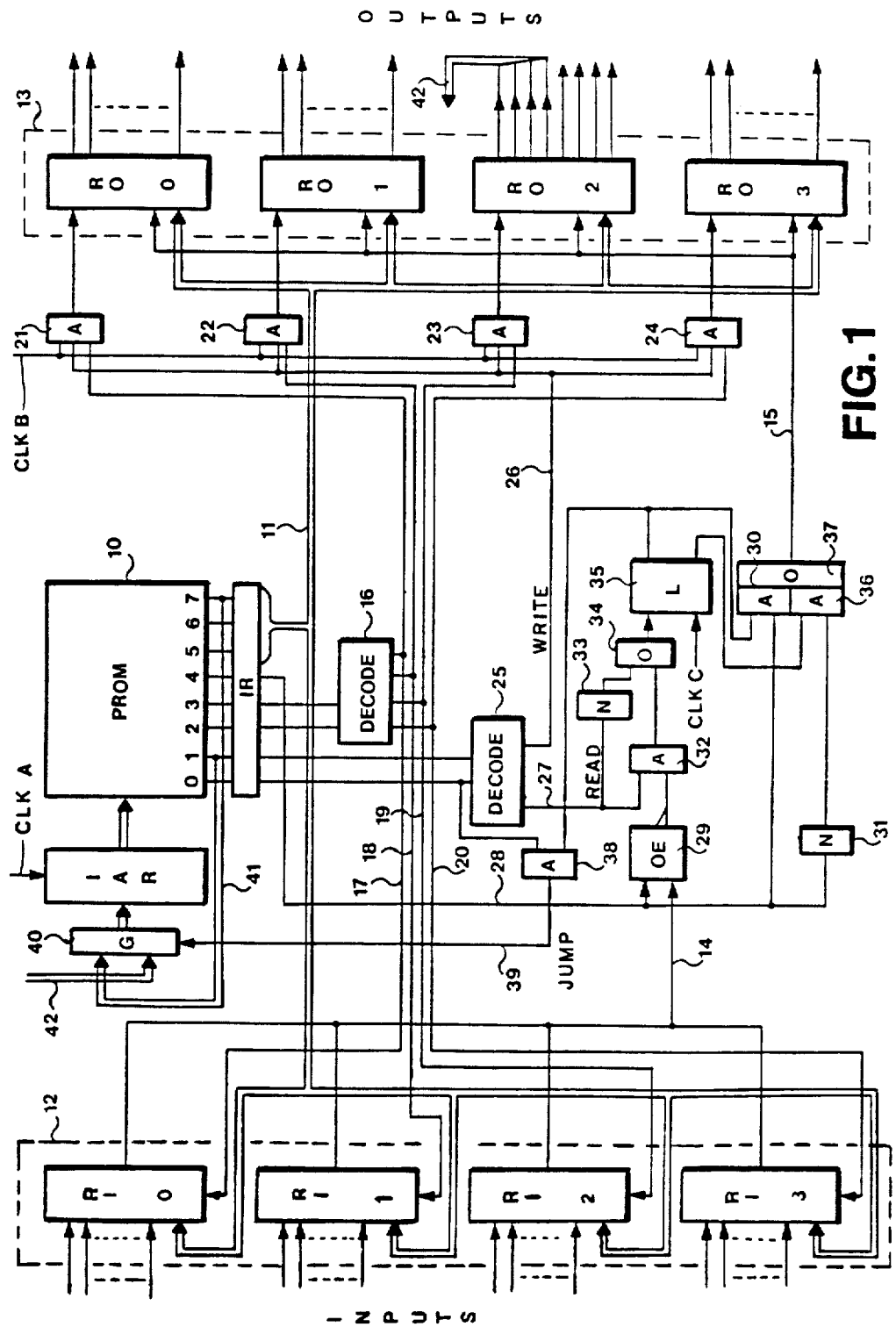
FIG. 1 is a schematic diagram of the programmable logic controller of this invention.

FIG. 1 schematically shows a programmable logic controller according to this invention. The programmable logic controller is controlled by a control program which is comprised of a sequence of 8-bit instructions and stored in a control memory 10 which can advantageously be a programmable read-only memory, PROM. Control memory 10 is addressed by the contents of an instruction address register IAR which, in the embodiment shown in the figure consists of a counter, the contents of which is sequentially increased by a clock signal CLK A, which clocks the controller operating cycle. The instructions read from control memory 10, are loaded into an 8-stage instruction register IR. Bits 5, 6 and 7 of the instruction stored in instruction register IR are applied to input selector 12 and output selector 13, via address bus 11. Input selector 12 selectively connects one of a plurality of input terminals to data input line 14. In the embodiment of FIG. 1, there are 32 input terminals and input selector 12 comprises four 8-input multiplexers RI0 to RI3 of the 74 LS 251 type marketed by Texas Instruments Inc.

Address bus 11 and data input line 14 are respectively connected to the address input and to the output of each of multiplexers RI0 to RI3. Output selector 13 selectively connects a data output line 15 to a plurality of output terminals. In the embodiment shown in FIG. 1, there are 32 output terminals and selector 13 is comprised of four 8-output memory demultiplexers R00 to R03 of the 74 LS 259 type marketed by Texas Instruments Inc. It is recalled that a memory demultiplexer is essentially a demultiplexer whose output condition is stored into latches. Address bus 11 and data output line 15 are respectively connected to the addressd input and to the input of each of demultiplexer RO0 to RO3. Bits 2 and 3 of the instruction stored in instruction register IR are applied to a 4-output decoding circuit 16 which selectively drives one of the four outputs respectively connected to lines 17, 18, 19 and 20, in accordance with the value of bits 2 and 3. Lines 17, 18, 19 and 20 are respectively connected to the select input of multiplexers RI0 to RI3 and to an input of four AND gates 21, 22, 23 and 24, the outputs of which are respectively connected to the select inputs of demultiplexers RO0 to RO3. Bits 0 and 1 of the instruction stored in instruction register IR are applied to a 2-output decoding circuit 25 having one of its outputs connected to a WRITE line 26 which is connected to one input of AND gates 21 to 24. Clock signal CLK B which is a delayed version of clock signal CLK A, is also applied to AND gates 21 to 24. The second output of decoding circuit 25 is connected to a READ line 27.

Bit 4 of the instruction stored in instruction register IR is applied via line 28 to an input of inverted XOR circuit 29 the second input of which is connected to data input line 14, to an input of AND gate 30, and to the input of an inverter 31. The outputs of inverted XOR circuit 29 and READ line 27 are applied to an AND gate 32. The output of AND gate 32 and the output of an inverter 33 whose input is connected to line 27, are applied to an OR gate 34 the output of which is connected to the input of a Condition latch 35. The clock input of Condition latch 35 receives clock signal CLK C which is a delayed version of clock signal CLK B. The true output of Condition latch 35 is applied to the second input of AND gate 30. The complementary output of Condition latch 35 and the output of inverter 31 are applied to an AND gate 36. The outputs of AND gates 30 and 36 are applied to an OR gate 37 the output of which is connected to data output line 15. Bit 0 of the instruction stored in register IR and the true output of Condition latch 35 are applied to an AND gate 38 whose output is connected to a JUMP line 39 controlling a transfer gate 40. Transfer gate 40 receives bits 1 to 7 of the instruction read from control memory 10 via a bus 41, and four of the eight outputs of demultiplexer R02 via a bus 42.

Figure 2:
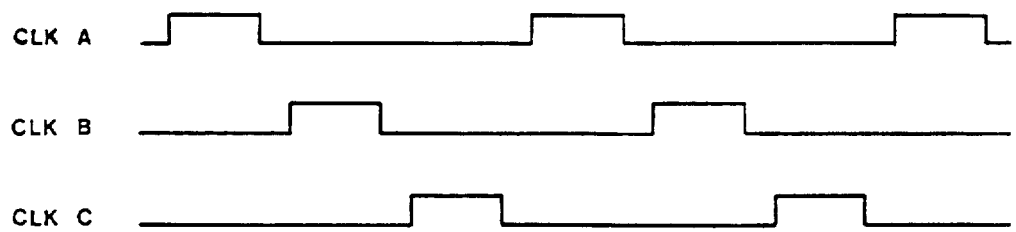
FIG. 2 is a timing diagram illustrating the shape of the clock signals used by the programmable logic controller of this invention.

FIG. 2 shows the shape and relative sequence of clock signals CLK A, CLK B and CLK C.

The programmable logic controller of this invention uses a very small set of instructions which comprises only three 8-bit instructions referenced READ, WRITE and JUMP.

READ Instruction

The READ instruction is used to read the binary level of a selected input terminal and to set the Condition latch to a binary state which depends on the level of the selected input terminal and that of a condition bit contained in the instruction. The READ instruction has the following format:

T,0090

Bits 0 and 1 define the operation code. When both are set to 0, a READ instruction is specified.

Bits b2 and b3 select one of the four multiplexers RI0 to RI3.

Bits b5, b6, b7 select one of the eight inputs of a multiplexer.

Bit b4 is the condition bit.

At the end of a READ Instruction, the condition latch is:

set to 1 if the level of the selected input terminal is identical to that of the condition bit, and set to 0 if the level of the selected input terminal is different from that of the condition bit.

A READ instruction could be, for example: 00101011

Input 3 of multiplexer RI2 is compared to "1" and the Condition latch is set to a binary level depending on the result of the comparison.

In assembler language, the READ instruction can be written as follows:

RO IX, for specifying: reading input X of multiplexer I with the condition bit being set to "1", and

RZ IX, for specifying: reading input X of multiplexer I with the condition bit being set to "0".

WRITE Instruction

A WRITE instruction is used for providing the binary state of the Condition latch or its inverse at a selected output, according to the value of a condition bit contained in the instruction. The WRITE instruction has the following format:

T,0110

Bits 0 and 1 define the operation code. When set to 0 and 1 respectively, they specify a WRITE instruction.

Bits b2 and b3 select one of four demultiplexers RO0 to RO3.

Bits b5 and b7 select one of the eight outputs of a demultiplexer.

Bit b4 is the condition bit.

If b4=1, the binary state of the Condition latch is provided at the selected output.

If b4=0, the inverse state of the Condition latch is provided at the selected output.

At the execution of a WRITE instruction, the Condition latch is set to "1".

A WRITE instruction could be, for example, 01011101.

Output 5 of demultiplexer RO1 is set to 1 or 0 depending on whether the Condition latch is set to 1 or 0. In assembler language, the WRITE instruction can be written as follows:

WO OX, for specifying: providing the state of the Condition latch at output X of demultiplexer 0, and

WZ OX, for specifying: providing the inverse state of the Condition latch at output X of demultiplexer 0.

JUMP Instruction

A JUMP instruction is used for jumping or not to an instruction address contained in the JUMP instruction depending on whether the Condition latch is set to 1 or 0. The JUMP instruction has the following format:

T,0120

Bit 0 defines the operation code. When set to 1, a JUMP instruction is specified.

Bits b1 to b7 specify the JUMP address in a block of 128 instructions.

Jumping to the address specified in the JUMP instruction is performed only when the Condition latch is set to 1.

At the execution of a JUMP instruction, the Condition latch is set to 1.

In assembler language, the JUMP instruction can be written as follows:

J T, with T specifying the JUMP address.

It should be noted that, since at the end of the execution of a WRITE or JUMP instruction, the Condition latch is set to 1, when a WRITE instruction is executed after a WRITE or JUMP instruction, the condition bit is an immediate data, i.e., the condition bit is directly provided at the selected output.

The operation of the logic controller shown in FIG. 1 will be described now. The contents of instruction address register IAR is incremented by one unit at each positive transition of clock signal CLK A. The contents of register IAR addresses control memory 10 and the addressed instruction is read out therefrom and stored into instruction register IR. If bits 0 and 1 in instruction register IR are both set to "1", thereby specifying a READ instruction, decoding circuit 25 sets READ line 27 to a high level and WRITE line 26 to a low level. This low level on WRITE line 26 sets the output of AND gates 21 and 24 to a low level, which inhibits the select input of demultiplexers RO0 to RO3. Bit 0 in instruction register IR being set to 0, the output of AND gate 38 is at a low level and JUMP line 39 disconnects buses 41 and 42 from register IAR.

According to the value of bits 2 and 3 of the instruction stored in register IR, decoding circuit 16 causes one of lines 17 to 20 to go high. For instance, if it is assumed that the READ instruction in register IR is: 00101011, decoding circuit 16 sets line 18 to a high level and lines 17, 19 and 20 to a low level, thereby selecting multiplexer RI1 and inhibiting multiplexers RI0, RI2 and RI3. Bits 5 to 7 of register IR are applied to multiplexers RI0 to RI3 via address bus 11 and, in the above indicated example, select input 3 of multiplexer RI1, the remaining multiplexers being inhibited. Then the condition of input 3 of multiplexer RI0 is provided at data input line 14 and compared to bit 4 (condition bit) in register IR by means of inverted XOR circuit 29. If the result of the comparison is positive, inverted XOR circuit 29 produces a high level which is applied to the set input of Condition latch 35 through gates 32 and 34. At the positive transition of signal CLK C, Condition latch 35 is set to 1. If the result of the comparison is negative, inverted XOR circuit 29 produces a low level and the Condition latch is set to 0 at the positive transition of signal CLK C.

Assuming the same example as above but wherein bits 0 and 1 in register IR are respectively set to "0" and "1", specifying a WRITE instruction, decoding circuit 25 causes WRITE line 26 to go high and READ line 27 to go low. This low level sets the output of AND gate 32 to a low level, thereby disconnecting data input line 14 from Condition latch 35.

Bit 0 in register IR being set to "0", JUMP line 39 is low and disconnects buses 41 and 42 from instruction address register IAR. According to the value of bits 2 and 3 in register IR, decoding circuit 16 causes one of lines 17 to 20, for instance line 18, to go high, which preselects demultiplexer RO1, and the remaining lines to go low, which inhibits the remaining demultiplexers. If bit 4 (condition bit) in register IR is "1", the condition of the true output of condition latch 35 is provided at data output line 15 through gates 30 and 37. If bit 4 is "0", the condition of the complementary output of condition latch 35 is provided at data output line 15 through gates 36 and 37. At the positive transition of clock signal CLK B, demultiplexer RO1 is selected through AND gate 22 and the condition of the data input line is provided at the output of demultiplexer RO1 specified by the contents of address bus 11. With READ line 27 being low, the output of inverter 33 is high and Condition latch 35 is set to 1 at the positive transition of clock signal CLK C.

Now, the execution of a JUMP instruction will be described in the following by, first of all, disregarding bus 42 which connects four outputs of demultiplexer RO2 to transfer gate 40. When a JUMP instruction is read from control memory 10 and loaded into register IR, bit 0 in said register IR is at "1" and decoding circuit 25 causes WRITE line 26 and READ line 27 to go low, thereby disconnecting demultiplexers RO0 to RO3 from data output line 15 and the data input line from Condition latch 35. If Condition latch 35 is set to "1", JUMP line 39 is high and the jump address specified by bits 1 to 7 of the instruction read from control memory 10, is applied to the preset input of instruction address register IAR. This address is made available at the output of register IAR at the next positive transition of clock signal CLK A.

If condition latch 35 is set to "0", JUMP line 39 is low and the JUMP address is not applied to register IAR. At the positive transition of clock signal CLK C, Condition latch 35 is set to 1 in response to the low level on READ line 27.

In a JUMP instruction, the JUMP address is defined by seven bits and therefore, allows only 128 instructions to be addressed. The use of a JUMP instruction not provided with the improvement described in the following, restricts the capacity of the control memory to a maximum of 128 instructions.

According to a further feature of the present invention, the capacity of control memory 10 is increased to $w^N$ blocks of 128 instructions, by using N of the outputs of the logic controller as a block pointer for selecting one of the N blocks, and the JUMP address contained in the JUMP instruction for selecting one of the 128 instructions in the selected block. In the embodiment shown in FIG. 1, four outputs (outputs 0 to 3) of demultiplexer RO2 are used as a block pointer and the capacity of control memory 10 is increased to 16 blocks of 128 instructions.

Instruction address register IAR is comprised of an 11 stage counter, with the four most significant bits of register IAR allowing sixteen blocks of 128 instructions to be addressed and the seven remaining bits allowing the 128 instructions of the selected block, to be addressed. When a JUMP instruction is executed, JUMP line 39 is high and transfer gate 40 applies the jump address on bus 41 and the block pointer on bus 42 to the seven least significant stages and to the remaining four stages of register IAR, respectively. When conceiving the sequence of instructions, the programmer must keep in mind that in the execution of a JUMP instruction, the block pointer is comprised of outputs to any JUMP instruction, and must write these outputs in the appropriate condition by means of WRITE instructions.

For instance, if a jump operation to address 100 of block 2 is to be carried out, first of all, it would be necessary to set outputs 0, 1, 2 and 3 of demultiplexer RO2 to 0, 0, 1 and 0, respectively, by means of WRITE instructions, and then provide a JUMP instruction specifying jump address 1100100.

Figure 3:
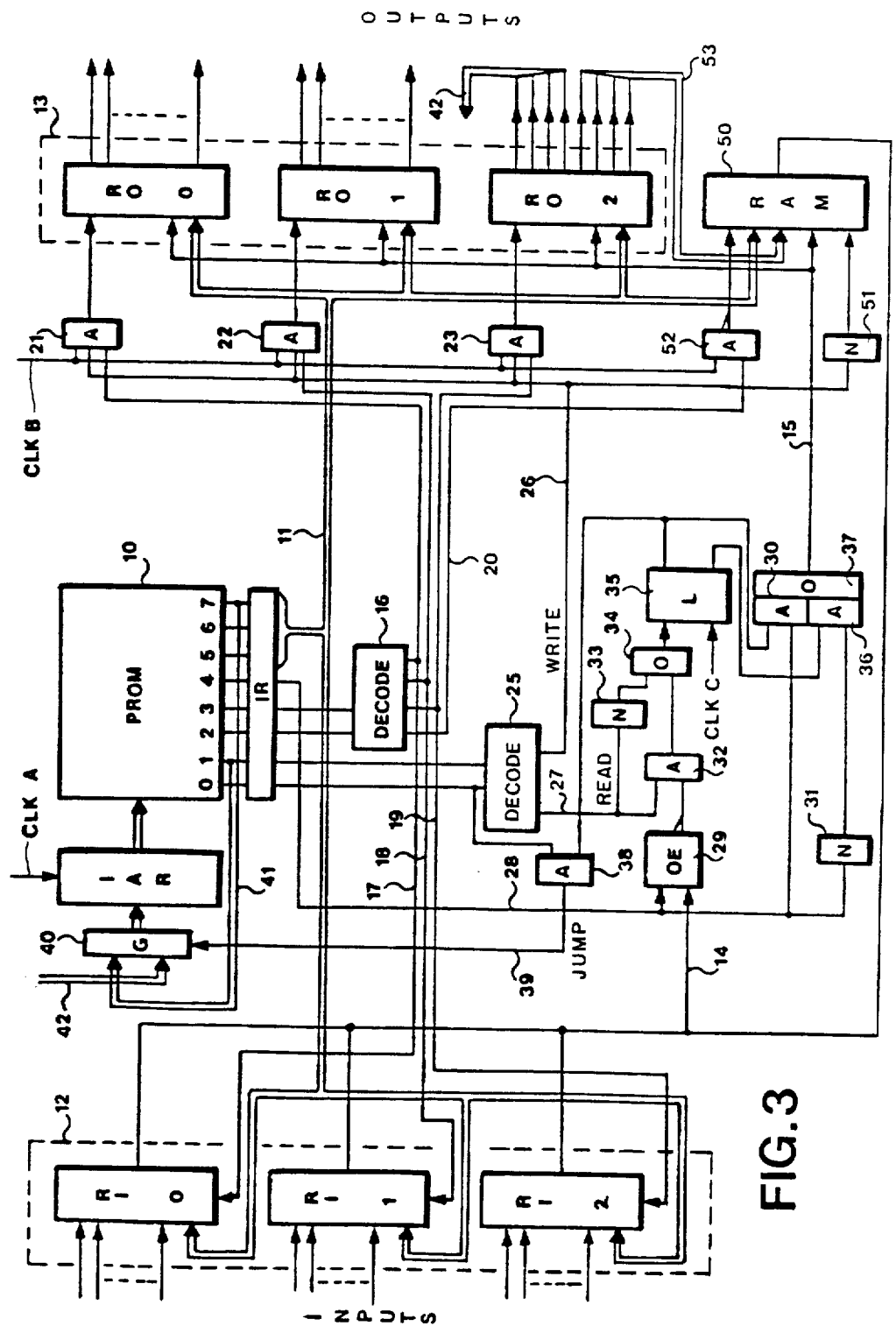
FIG. 3 is a schematic diagram of an improvement of the programmable logic controller of FIG. 1.

FIG. 3 is a block diagram of the logic controller shown in FIG. 1 which has been improved by the addition of a working random access memory which allows the previous levels of the controller inputs to be stored. The controller of FIG. 3 differs from that of FIG. 1 by the fact that a working memory 50 is substituted for multiplexer RI3 and memory demultiplexer RO3.

For clarity, the elements common to FIGS. 3 and 1 bear the same references. Working memory 50 is comprised of a 128×1-bit random access memory (RAM) whose data input is connected to data output line 15 and data output is connected to data input line 14. The read/write input of working memory 50 is connected to WRITE line 26 through inverter 51. Working memory 50 operates in read or write mode depending on whether the read/write input thereto is high or low. The select input of working memory 50 is connected to the output of a NAND gate 52 whose one input is connected to line 20 and another input receives signal CLK B. Working memory 50 is arranged into sixteen blocks of eight bits.

A block is selected by a block pointer provided by the four outputs 4 to 7 of demultiplexer RO2 and said pointer is applied via bus 53 to the four most significant positions of the address input of working memory 50. Address bus 11 is applied to the three least significant positions of the address input of working memory 50 and allows one of the eight bits in the block selected by the block pointer, to be selected.

If bus 53 were eliminated, working memory 50 would act in the read mode, exactly as multiplexer RI3 of FIG. 1 and, in the write mode, exactly as demultiplexer RO3. Its capacity would then be limited to eight bits addressed by the address on address bus 11. The use of M controller outputs as a block pointer allows the working memory capacity to be increased to $2^M$ blocks of eight bits in the same manner as the capacity of control memory 10 was increased, as explained above.

In the example shown in FIG. 3, the capacity of working memory 50 is increased to sixteen blocks by the use of four outputs 3 to 7 of demultiplexer RO2.

When a READ instruction having bits 2 and 3 set to 1, is read from control memory 10, decoding circuit 16 causes line 20 to go high and decoding circuit 25 causes READ line 26 to go low. Write line 26 being low, the output of inverter 51 is high and sets working memory 50 in read mode. At the positive transition of signal CLK B, the output of NAND gate 52 goes low, which selects working memory 50 and the one-bit position addressed by the contents of buses 11 and 53 is read on data input line 14. The level of data input line 14 is compared to that of the condition bit in register IR and the result of the comparison is used for controlling the condition latch as described above while referring to FIG. 1.

When a WRITE instruction having bits 2 to 4 being set to 1, is read from control memory 10, the decoding circuit 16 causes line 20 to go high and decoding circuit 25 causes WRITE line 26 to go high. WRITE line 26 being high, the output of inverter 51 is low and sets working memory 50 into the write mode. At the positive transition of signal CLK B, the output of NAND gate 52 goes low, which selects control memory 50 and the level of data output line 15 is written in the address specified by the contents of buses 11 and 53.

As for the JUMP instructions, the programmer must keep in mind that when he wants to access working memory 50, the block pointer is provided by outputs 4 to 7 of demultiplexers RO2 and that first, he has to write them into the appropriate conditions.

Now, two examples relating of the basic functions will be described in the following for a better understanding of the advantages of the invention.

EXAMPLE 1

Performing the AND function of the conditions of two inputs I1 and providng I2 and the result thereof at output 01.

The set of instructions required for performing this function is as follows:

T,0190

It should be noted that only four instructions are necessary for performing this function while six instructions are required for performing the same function by means of the programmable logic controller described in French Pat. No. FRA2,037,035.

EXAMPLE 2

Performing the exclusive OR function of the conditions of two inputs I1 and I2 and providing the result thereof at output 01,

T,0200

It should be noted that only six instructions are necessary for performing an exclusive OR function while nine instructions are required for performing the same function by means of the programmable logic controller described in French Pat. No. FRA2,037,035.

Having thus described my invention, what I claim as new, and desire to secure by Letters Patent is:

1. A programmable logic controller including: a plurality of input terminals,
a plurality of output terminals, a control memory (10) for storing a sequence of instructions selected from an instruction set consisting of only three different types of instructions, said instruction set including, instructions of a first type (READ) and instructions of a second type (WRITE), each of said first and second types of instructions comprising an operation code, a condition bit and an address field, and instructions of a third type (JUMP), each of said JUMP instructions including an operation code and an address field, and
addressing means (IAR) for sequentially addressing said control memory, at a beginning address supplied to said controller,
input selecting means (12) for selectively connecting one of said input terminals to a first line (14) in response to the contents of the address field of an instruction read from said control memory,
output selecting means (13) for selectively connecting a second line (15) to one of said output terminals in response to the contents of the address field of the instruction read from said control memory,
a condition latch (35), settable as a function of the instruction type, the condition bit and the data on said first line,
comparing means (29) for comparing the level of said first line with that of said condition bit,
decoding means (25) for decoding the operation code of the instruction read from said control memory,
means (32) for, in response to the decoding of a first type-instruction by said decoding means, setting the condition latch to a first or a second state depending on whether the result of the comparison provided by the comparing means is affirmative or negative, and
means (30, 31, 36, 37) for, in response to the decoding of a second type-instruction by said decoding means, providing the level of said condition bit or its inverse at said second line (15) as a function of whether the condition latch is in a first or second state respectively, and
means (38-41) for applying the contents of the address field of said third type-instruction read from said control memory to the addressing means (IAR) if the condition latch is currently set to its first state by a previous instruction.

2. A programmable logic controller as set forth in claim 1, characterized in that said control memory is arranged in $2^N$ blocks and in that it includes means (42) for applying N of said output terminals to the addressing means (IAR) when said third type instruction is read from said control memory and the condition latch is set to its first state.

3. A programmable logic controller as set forth in claim 1, including a random access memory (50) which is addressed by the address field of the instruction read from the memory, which has its input connected to said second line (15) and its output connected to said first line (14) and operates in the read or write mode depending on whether the instruction read from the memory is of the first (read) or second (write) type.

4. A programmable logic controller as set forth in claim 3, characterized in that said random access memory is arranged in $2^M$ blocks and in that it includes means (53) for connecting M of said output terminals to the address input of the random access memory, as a block address pointer.

* * * * *